United States Patent
Herlein (10) Patent No.: US 9,456,025 B2
(45) Date of Patent: Sep. 27, 2016

(54) METHOD AND SYSTEM FOR DETERMINING IDENTITY/PRESENCE OF A MOBILE DEVICE USER FOR CONTROL AND INTERACTION IN CONTENT DISTRIBUTION

(75) Inventor: Gregory Charles Herlein, San Francisco, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 350 days.

(21) Appl. No.: 13/823,773

(22) PCT Filed: Sep. 17, 2010

(86) PCT No.: PCT/US2010/002527
§ 371 (c)(1),
(2), (4) Date: Mar. 15, 2013

(87) PCT Pub. No.: WO2012/036654
PCT Pub. Date: Mar. 22, 2012

(65) Prior Publication Data
US 2013/0304789 A1    Nov. 14, 2013

(51) Int. Cl.
*H04L 29/08*    (2006.01)
*H04L 29/06*    (2006.01)
*G06Q 30/02*    (2012.01)

(52) U.S. Cl.
CPC .............. *H04L 67/10* (2013.01); *G06Q 30/02* (2013.01); *H04L 63/102* (2013.01); *H04L 67/1002* (2013.01)

(58) Field of Classification Search
None
See application file for complete search history.

(56) References Cited

U.S. PATENT DOCUMENTS

| | | | |
|---|---|---|---|
| 7,162,451 B2 | 1/2007 | Berger et al. | |
| 7,412,224 B2* | 8/2008 | Kotola et al. | 455/403 |
| 7,549,578 B2* | 6/2009 | Omino et al. | 235/381 |
| 7,779,149 B2* | 8/2010 | Doi et al. | 709/236 |
| 8,255,785 B2* | 8/2012 | Baumert et al. | 715/201 |
| 8,359,643 B2* | 1/2013 | Low et al. | 726/9 |
| 2003/0016630 A1* | 1/2003 | Vega-Garcia et al. | 370/252 |
| 2004/0072557 A1 | 4/2004 | Paila et al. | |
| 2006/0085543 A1* | 4/2006 | Hrastar | H04L 63/1408 709/224 |
| 2006/0123133 A1* | 6/2006 | Hrastar | H04L 63/1408 709/238 |
| 2006/0206375 A1 | 9/2006 | Scott et al. | |
| 2006/0271953 A1* | 11/2006 | Jacoby et al. | 725/34 |
| 2007/0094741 A1* | 4/2007 | Lynn | H04L 41/0893 726/26 |

(Continued)

FOREIGN PATENT DOCUMENTS

| | | |
|---|---|---|
| CN | 101556609 | 10/2009 |
| JP | 2003/125379 | 4/2003 |

(Continued)

*Primary Examiner* — Ninos Donabed
(74) *Attorney, Agent, or Firm* — Brian J. Dorini; Robert D. Shedd (57) ABSTRACT

A method and system for using a media access control (MAC) address of a mobile device for communication in a content distribution environment includes detecting the MAC address of a mobile device when in or within a predetermined range of the content distribution environment. Once the MAC address has been detected, registered user information of the mobile device is obtained via one or more databases and personalized media content is then delivered to one or more display devices in close proximity to the mobile device within the content distribution environment. In alternative embodiments, a user's presence within the content distribution environment is automatic and transparent to the mobile device user.

8 Claims, 6 Drawing Sheets

(56) References Cited

U.S. PATENT DOCUMENTS

| | | | |
|---|---|---|---|
| 2007/0189194 A1* | 8/2007 | Hrastar | H04L 63/1408 370/310 |
| 2007/0244752 A1 | 10/2007 | Bayne | |
| 2008/0109843 A1* | 5/2008 | Ullah | G06Q 30/02 725/34 |
| 2008/0109888 A1* | 5/2008 | Ullah | 726/7 |
| 2008/0139306 A1* | 6/2008 | Lutnick | G06Q 30/02 463/30 |
| 2008/0167106 A1* | 7/2008 | Lutnick | G07F 17/32 463/16 |
| 2008/0311934 A1 | 12/2008 | Soderstrom | |
| 2009/0006211 A1* | 1/2009 | Perry et al. | 705/14 |
| 2009/0176505 A1* | 7/2009 | Van Deventer et al. | 455/456.1 |
| 2009/0182630 A1* | 7/2009 | Otto | G06Q 20/20 705/14.1 |
| 2009/0205019 A1* | 8/2009 | Treu et al. | 726/4 |
| 2009/0261944 A1* | 10/2009 | Fukuta et al. | 340/5.8 |
| 2009/0298480 A1 | 12/2009 | Khambete et al. | |
| 2010/0017725 A1* | 1/2010 | McCarthy | H04W 4/04 715/745 |
| 2010/0093331 A1* | 4/2010 | Rooks | H04M 3/42144 455/418 |
| 2010/0174607 A1 | 7/2010 | Henkin et al. | |
| 2010/0205037 A1* | 8/2010 | Besehanic | 705/10 |
| 2010/0254282 A1* | 10/2010 | Chan | H04W 24/08 370/253 |
| 2010/0255867 A1* | 10/2010 | Ishii | H04J 11/0023 455/501 |
| 2010/0280907 A1 | 11/2010 | Wolinsky et al. | |
| 2010/0287052 A1 | 11/2010 | Minter et al. | |
| 2011/0125512 A1* | 5/2011 | Huang | 705/1.1 |
| 2011/0276396 A1* | 11/2011 | Rathod | G06F 17/30867 705/14.49 |

FOREIGN PATENT DOCUMENTS

| | | |
|---|---|---|
| JP | 2003125379 | 4/2003 |
| JP | 2005/512208 | 4/2005 |
| JP | 2005512208 | 4/2005 |
| JP | 2006/323467 | 11/2006 |
| JP | 2006323467 | 11/2006 |
| JP | 2009163715 | 7/2009 |
| JP | 2010068107 | 3/2010 |
| WO | WO03013043 | 2/2003 |
| WO | WO03049359 | 6/2003 |

\* cited by examiner

METHOD AND SYSTEM FOR DETERMINING IDENTITY/PRESENCE OF A MOBILE DEVICE USER FOR CONTROL AND INTERACTION IN CONTENT DISTRIBUTION

RELATED APPLICATIONS

This application claims the benefit of PCT Patent Application No. US2010/002527 filed on Sep. 17, 2010 entitled Method and System For Determining Entity/Presence of a Mobile Device User For Control And Interaction in Content Distribution the teachings of which are specifically incorporated herein by reference.

FIELD OF THE INVENTION

The present invention generally relates to communication methods within content distribution environments and systems and, more particularly, to a method, apparatus and system for determining the identity of a mobile device user and thereby their presence using a media access control (MAC) address for control and interaction within a content distribution playback environment.

BACKGROUND OF THE INVENTION

Information and content distribution systems are used to provide information and content to a plurality of end systems. For example, in the advertising realm, providing in-store retail media content is becoming the most popular advertising medium in use today, with broadcast distribution being its primary means of content presentation. That is, in recent years retailers and the managers of public spaces have brought in video display systems for advertising use. In such systems, content is distributed by a server and received at receivers such as a respective set-top-box for each display or group of displays and associated speakers. Retailers use the displays and speakers to present their current offerings or sale information, while the public spaces sell time on the video displays and speakers to advertisers either national or local, knowing that large numbers of consumers will see the presentation.

However, as will be appreciated by those providing the advertising (i.e., either the content distribution environment or the product/service provider), the most effective advertising is preferably targeted to the particular viewer, for example, such that a presentation for a specific viewer is selected in such a way that the information about the offered product is a good match for the viewer(s) near the screen.

In order to implement this type of targeted deployment of advertising media, it is critical to uniquely identify the people near the screen or display device in the content distribution environment. One such unique means to specifically identify a potential or existing customer is to detect the MAC address of their phone or mobile device and use that as a unique index or key to look up demographic or identity information about the person who owns the phone. Once this information is known, the advertising media can be selected and displayed accordingly.

SUMMARY OF THE INVENTION

Embodiments of the present invention address the deficiencies of the prior art by providing a method, apparatus and system for using the ESN of a mobile electronic device for control and interaction within a content distribution playback environment.

According to an embodiment, the method for communication in a content distribution environment includes detecting a media access control (MAC) address of a mobile device present within the content distribution environment, identifying demographic information related to a registered owner of the mobile device using the detected MAC address information, and displaying media at display devices within the content distribution environment using the identified demographic information.

Further embodiments include identifying the display device closest to the detected user prior to displaying the media content, and selecting the media content according to the user's identification and corresponding demographic information relating to the detected user.

According to another embodiment, the system for communication in a content distribution environment includes at least one communication device (AP) for communicating with mobile devices within the content distribution environment and configured to detect a MAC address of a mobile device within the content distribution environment; and a server in signal communication with the at least one communication device. The server operates to identify demographic information related to a registered owner of the mobile device using the detected MAC address information; and display media at a display device located within the content distribution environment using the identified demographic information.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method and system for using a media access control (MAC) address of a cell phone or other mobile device, for control and interaction within a content distribution (playback) environment. Although the present invention will be described primarily within the context of a retail advertising network environment using a detected MAC Address for a mobile device, the specific embodiments of the present invention should not be treated as limiting the scope of the invention. It will be appreciated by those skilled in the art and informed by the teachings of the present invention that the concepts of the present invention can be advantageously applied in substantially any content distribution environment using other communications means such as Bluetooth.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable media and so executed by a computer or processor, whether or not such computer or processor is explicitly shown.

The various embodiments of the present invention include using MAC address information. For example, shoppers often have a cell phone or other mobile device having a unique MAC address. In accordance with embodiments of the present invention, an advantageous way to interact with the shopper is provided by detecting their presence in a content distribution environment (e.g., a retail location) using their mobile device MAC Address and coupling (i.e., linking) that user identification with other demographic information about the mobile device owner. A playback system (e.g., system 100) can then play an ad based on that information and the user's detected location within the content distribution environment (e.g., retail location) and/or on their uniquely identified mobile device.

Figure 1:
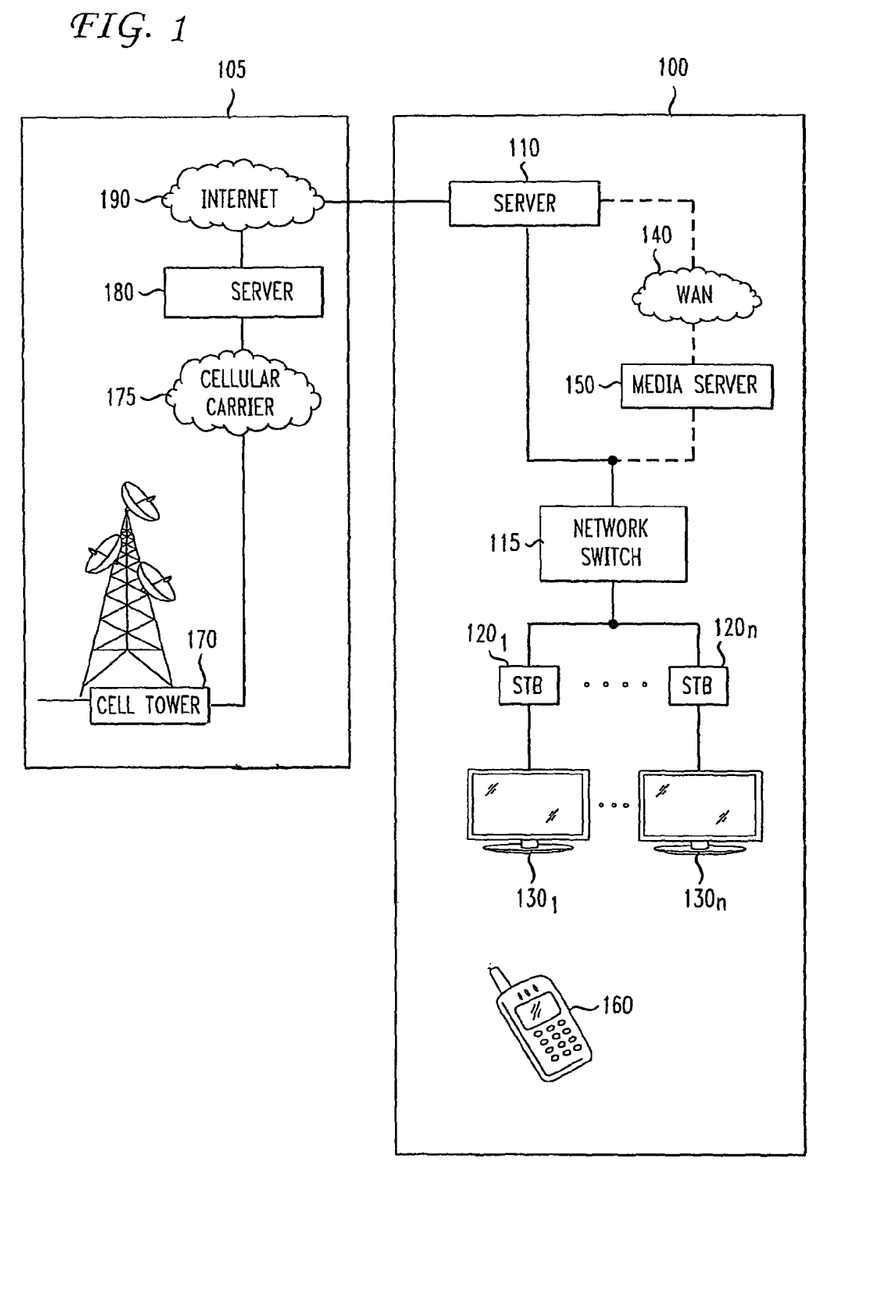
FIG. 1 depicts a high level block diagram of a content distribution system and a mobile communications system in which an embodiment of the present invention can be applied.

FIG. 1 depicts a high level block diagram of a content distribution system and a mobile communications system 105 in which an embodiment of the present invention can be applied. The content distribution system 100 of FIG. 1 illustratively comprises at least one server 110, a switch 115 (illustratively a network switch), a plurality of receiving devices such as tuning/decoding means (illustratively set-top boxes (STBs)) $120_1$-$120_n$, and a respective display $130_1$-$130_n$ for each of the set-top boxes $120_1$-$120_n$. The content distribution system 100 of FIG. 1 further includes an optional wide-area-network (WAN) 140, an optional media server 150 and an internet connected mobile communications device 160 (illustratively an internet connected mobile phone).

Although in the system 100 of FIG. 1, each of the plurality of set-top boxes $120_1$-$120_n$, is illustratively connected to a single, respective display, in alternate embodiments of the present invention, each of the plurality of set-top boxes $120_1$-$120_n$, can be connected to more than a single display. In addition, although in the content distribution system 100 of FIG. 1 the tuning/decoding means are illustratively depicted as set-top boxes 120, in alternate embodiments of the present invention, the tuning/decoding means of the present invention can comprise alternate tuning/decoding means such as a tuning/decoding circuit integrated into the displays 130 or other stand alone tuning/decoding devices and the like. Even further, receiving devices of the present invention can include any devices capable of receiving content such as text, audio, video and/or audio/video content.

Figure 2:
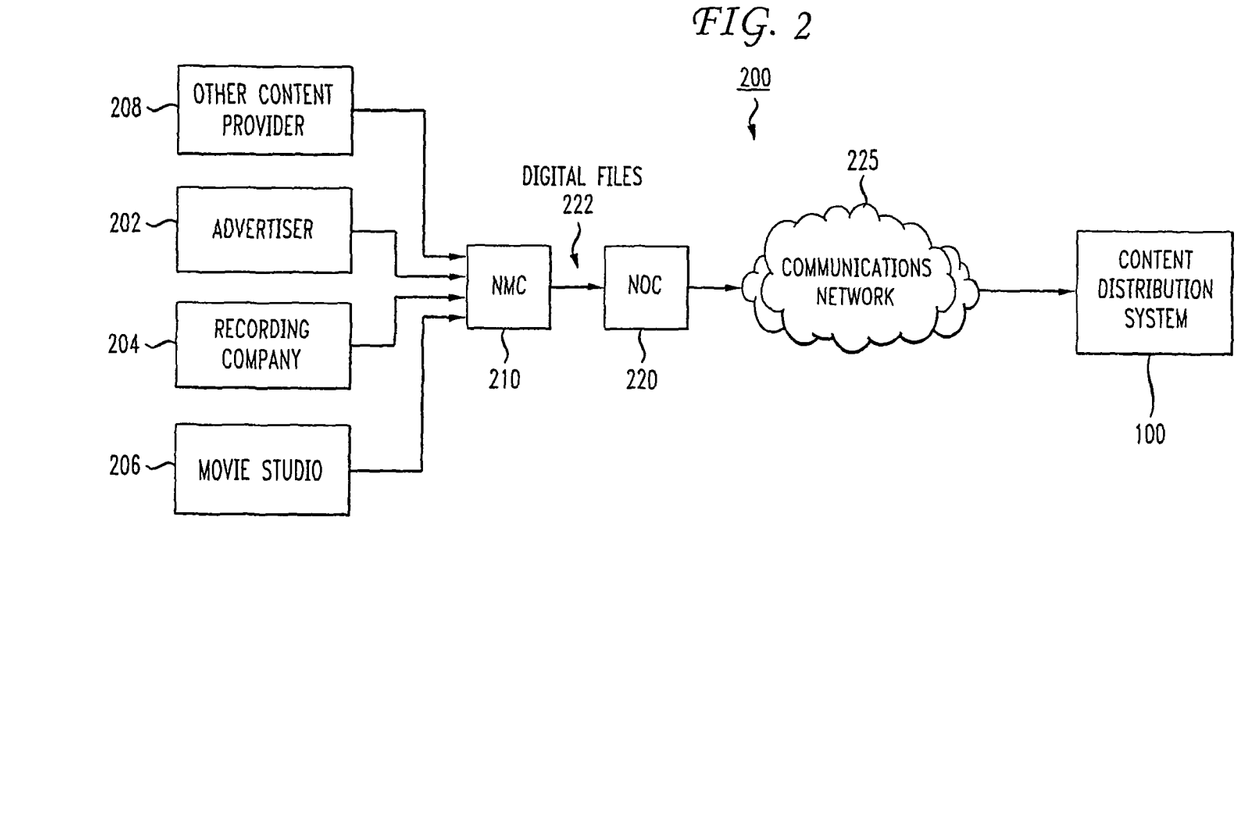
FIG. 2 depicts a high level block diagram of an in-store advertising network for providing in-store advertising in accordance with an embodiment of the present invention.

In one embodiment of the present invention, the content distribution system 100 of FIG. 1 can be a part of an in-store advertising network. For example, FIG. 2 depicts a high level block diagram of an in-store advertising network 200 for providing in-store advertising. In the advertising network 200 of FIG. 2, the advertising network 200 and distribution system 100 employ a combination of software and hardware that provides cataloging, distribution, presentation, and usage tracking of music recordings, home video, product demonstrations, advertising content, and other such content, along with entertainment content, news, and similar consumer informational content in an in-store setting. The content can include content presented in compressed or uncompressed video and audio stream format (e.g., MPEG2, MPEG4/MPEG4 Part 10/AVC-H.264, VC-1, Windows Media, etc.), although the present system is not limited to using these formats and may use other formats without departing from the intended scope of the invention.

In one embodiment of the present invention, software for controlling the various elements of the in-store advertising network 200 and the content distribution system 100 can include a 32-bit operating system using a windowing environment (e.g., MS-Windows™ or X-Windows operating system) and high-performance computing hardware. The advertising network 200 can utilize a distributed architecture and provides centralized content management and distribution control via, in one embodiment, satellite (or other method, e.g., a wide-area network (WAN), the Internet, a series of microwave links, or a similar mechanism) and in-store modules.

As depicted in FIG. 2, the content for the in-store advertising network 200 and the content distribution system 100 can be provided from an advertiser 202, a recording company 204, a movie studio 206 or other content providers 208. An advertiser 202 can be a product manufacturer, a service provider, an advertising company representing a manufacturer or service provider, or other entity. Advertising content from the advertiser 202 can consist of audiovisual content including commercials, "infomercials", product information and product demonstrations, and the like.

A recording company 204 can be a record label, music publisher, licensing/publishing entity (e.g., BMI or ASCAP), individual artist, or other such source of music-related content. The recording company 204 provides audio-visual content such as music clips (short segments of recorded music), music video clips, and the like. The movie studio 206 can be a movie studio, a film production company, a publicist, or other source related to the film industry. The movie studio 106 can provide movie clips, pre-recorded interviews with actors and actresses, movie reviews, "behind-the-scenes" presentations, and similar content.

The other content provider 208 can be any other provider of video, audio or audiovisual content that can be distributed and displayed via, for example, the content distribution system 100 of FIG. 1.

In one embodiment of the present invention, content is procured via the network management center 210 (NMC) using, for example, traditional recorded media (tapes, CD's, videos, and the like). Content provided to the NMC 210 is compiled into a form suitable for distribution to, for example, the local distribution system 100, which distributes and displays the content at a local site.

The NMC 210 can digitize the received content and provide it to a Network Operations Center (NOC) 220 in the form of digitized data files 222. It will be noted that data files 222, although referred to in terms of digitized content, can also be streaming audio, streaming video, or other such information. The content compiled and received by the NMC 210 can include commercials, bumpers, graphics, audio and the like. All files are preferably named so that they are uniquely identifiable. More specifically, the NMC 210 creates distribution packs that are targeted to specific sites, such as store locations, and delivered to one or more stores on a scheduled or on-demand basis. The distribution packs, if used, contain content that is intended to either replace or enhance existing content already present on-site (unless the site's system is being initialized for the first time, in which case the packages delivered will form the basis of the site's initial content). Alternatively, the files may be compressed and transferred separately, or a streaming compression program of some type employed.

The NOC 220 communicates digitized data files 222 to, in this example, the content distribution system 100 at a commercial sales outlet 230 via a communications network 225. The communications network 225 can be implemented in any one of several technologies. For example, in one embodiment of the present invention, a satellite link can be used to distribute digitized data files 222 to the content distribution system 100 of the commercial sales outlet 230. This enables content to easily be distributed by broadcasting (or multicasting) the content to various locations. Alternatively, the Internet can be used to both distribute audiovisual content to and allow feedback from commercial sales outlet 230. Other ways of implementing communications network 225, such as using leased lines, a microwave network, or other such mechanisms can also be used in accordance with alternate embodiments of the present invention.

Referring back to FIG. 1, the server 110 of the content distribution system 100 is capable of receiving content (e.g., distribution packs) and, accordingly, distribute them in-store to the various receivers such as the set-top boxes 120 and displays 130. That is, at the content distribution system 100, content is received and configured for streaming. The streaming can be performed by one or more servers configured to act together or in concert. The streaming content can include content configured for various different locations or products throughout the sales outlet 230 (e.g., store). For example, respective set-top boxes 120 and displays 130 can be located at specific locations throughout the sales outlet 230 and respectively configured to display content and broadcast audio pertaining to products located within a predetermined distance from the location of each respective set-top box and display.

The server 110 of the content distribution system 100 receives content and creates various different streams (e.g., content channels) of text, audio, video and/or audio/video to be communicated to the various receivers throughout the store. The streams can be individual channels of text, modulated audio, video and/or audio/video onto a radio frequency distribution or transmitted as data flows within a unicast or multicast internet protocol (IP) network. These streams can originate from one or more servers under the same logical set of control software.

Figure 3:
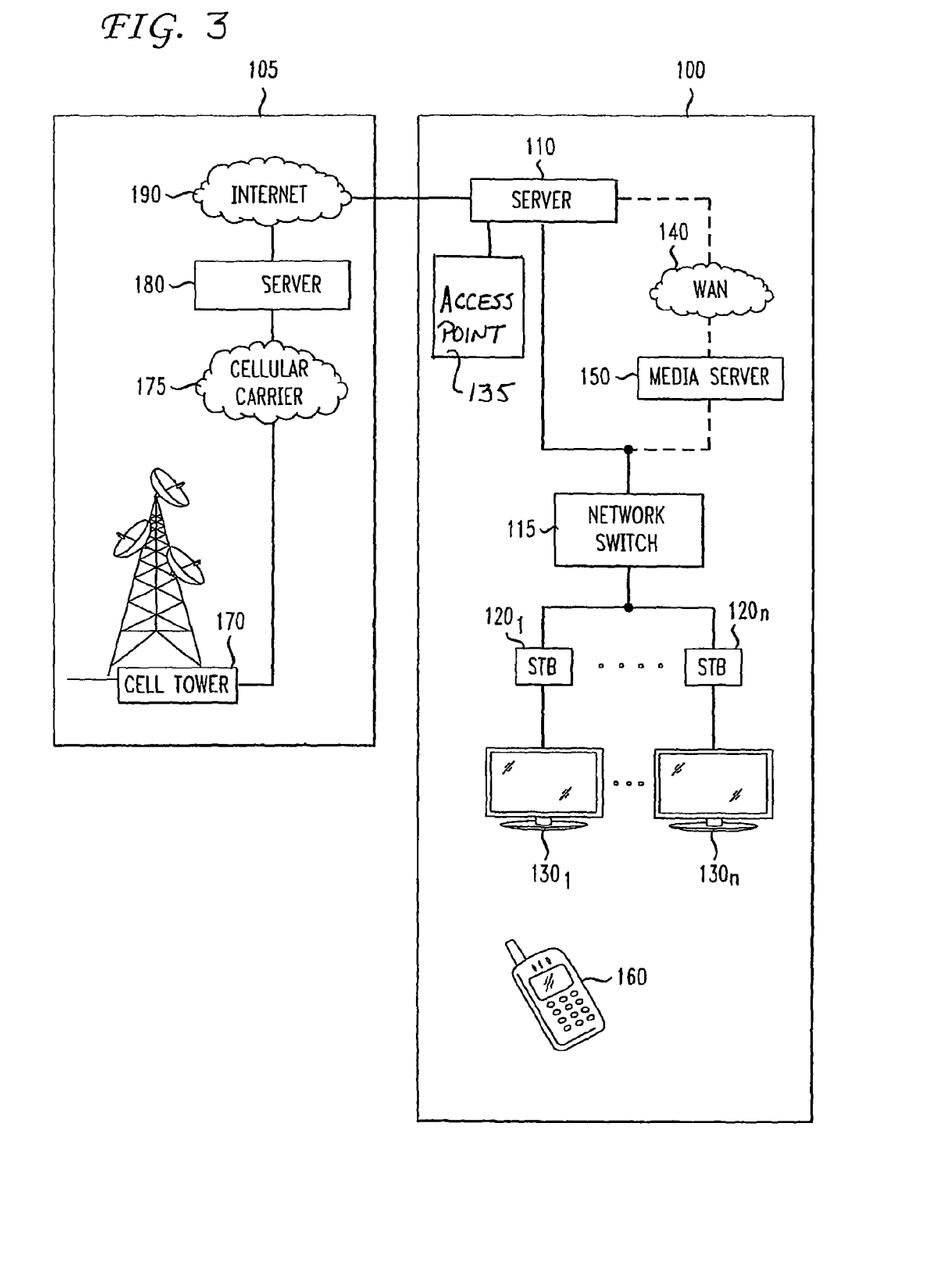
FIG. 3 depicts a high level block diagram of the content distribution system and mobile communication system according to an embodiment of the present invention.

Referring back to FIG. 1, the mobile communication system 105 of FIG. 1 illustratively comprises a cell tower 170, a cellular carrier 175, a server 180 (e.g., an SMS server) and an Internet 190. In the embodiment shown in FIG. 3, one or more a wireless Access Points (AP) 135 is added to the content distribution system 100. The APs 135 are connected to the server 110 and are generally distributed throughout the content distribution environment 100 depending on the size of the same.

Figure 4:
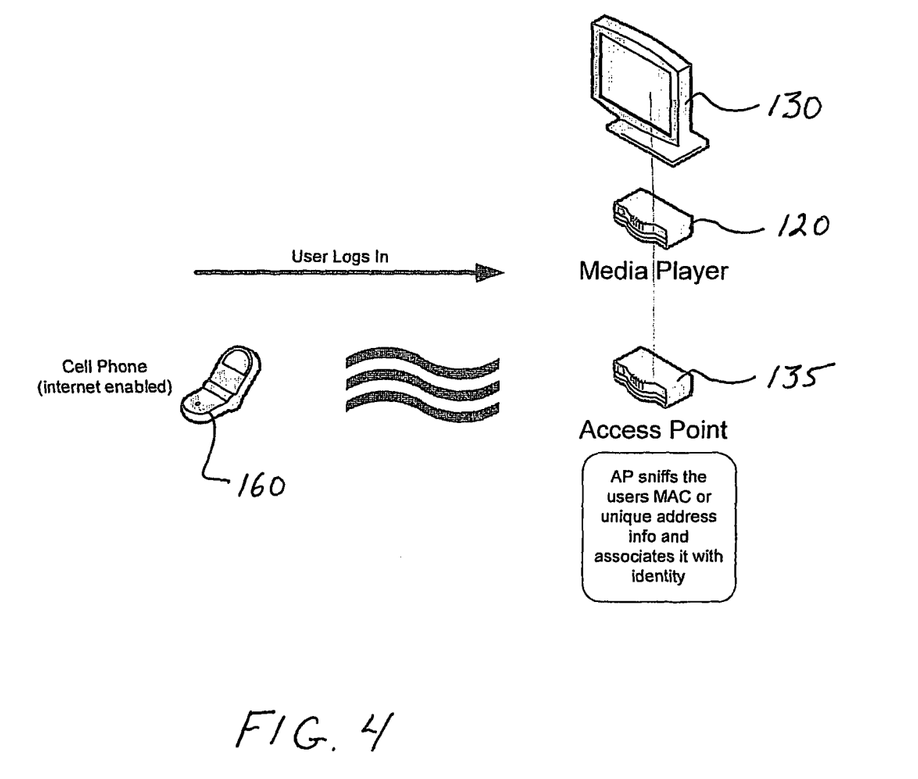
FIG. 4 depicts a block diagram of system for identifying a user's presence in accordance with an embodiment of the present invention.

In one implementation, shown in FIG. 4, the consumer is encouraged to use their mobile communication device 160 to communicate with an AP 135 to access some service (e.g., coupons, etc). The AP 135 is in communication with the media player 120 via server 110. As used herein, "media player" and "STB" are interchangeable. The displays 130 display the output of the medial players 120.

In one embodiment of the present invention, in order to encourage the user within the content distribution environment 100 to log in to the AP 135, the environment 100 could offer a promotional sale coupon or other type of marketing giveaway or promotion. Once the user has been encouraged to log in, the user would be required to provide some type of information about themselves (e.g., an email address, a name, a phone number, etc). Alternatively, the user may be merely checking into the location using a social networking tool such as, for example, FOURSQUARE™ or YELP™. In another embodiment, the wireless AP 135 can also allow the user network access by simply being an open access point or, for example, the AP could be associated with a loyalty program of some kind.

As will be explained in further detail below, once the MAC Address is detected/obtained, the server 110 refers to its own internal database, or alternatively can communicate with the internet 190 and one or more servers 180 (or databases) to obtain information about the user of the mobile device registered to the detected MAC Address. The obtained information can be, for example, user preferences from prior logins, or could include other demographic information relating to this particular user (e.g., product preferences, prior purchases, etc.). The server 110 and/or media server 150 can then "react" to the identified user's presence (and corresponding known information) by choosing the most appropriate advertising to play for this user at a display device 130 closest to them based on their detected location within the content distribution environment 100.

In one embodiment of the content distribution system 100 of FIG. 1, the server 110, as described above, creates various different streams (e.g., content channels) of text, audio, video and/or audio/video to be communicated to the various receivers (e.g., STBs) throughout the store. In such an embodiment, the server 110 is the central control point for content distribution and control and also delivers local over-rides to the stores. It can also be a central log collection and health status collection point for a set of stores. As described, the server 110 can "respond" to the detected presence of the mobile communications device 160 with a targeted response. That is, the server 110 communicates targeted information/advertising to the user of the mobile communications device 160 by causing the display of the info/advertising on a display 130 in the proximity of the detected mobile communications device.

For example, in one embodiment of the present invention, a display 130 in proximity of a user whose mobile device is detected by the AP 135 can be identified. That is, in one embodiment of the present invention, each display or group of displays can be assigned a unique number to display to a user the info/advertising for the user whose presence has been detected through their mobile device MAC address. As such, not only can the user's location within the content distribution environment be identified using the AP 135 and the detected MAC address, but the displays 130 closest to the user's detection location can be activated accordingly.

In an alternate embodiment of the content distribution system 100 of FIG. 1 which includes a local WAN 140 and a media server 150, the media server 150 typically delivers local over-rides to the stores and is the central log collection and health status collection point for a set of stores. The media server 150 is also typically the location where the configuration settings for stores are cached. In such an embodiment, the server 110 processes the information relating to the user of the detected mobile device and communicates that information over the WAN 140 to the media server 150. The communicated information directs the media server 150 to take an appropriate action in response to the received information (i.e., identify targeted advertising for this identified user).

In accordance with one embodiment, the AP 135 will have low level access to the raw packets and caches this data for a period of time. Software running in the AP first determines the "session" in which the user provided their personal information (i.e., some session from a past or prior visit to the environment 100). This is done by taking the name/phone number/email address, etc data and searching packet cache for this information. Once found, the packet is inspected to obtain the MAC Address used by the mobile device 160 the user had used for the session. The MAC address and the user's information is stored in a database (e.g., as part of server 110 or an external database to server 110) for the content distribution environment 100. Those of skill in the art will appreciate that the type of database used can be used and may not be a traditional relational database (RDBMS), but will be configured to facilitate later lookup.

Figure 5:
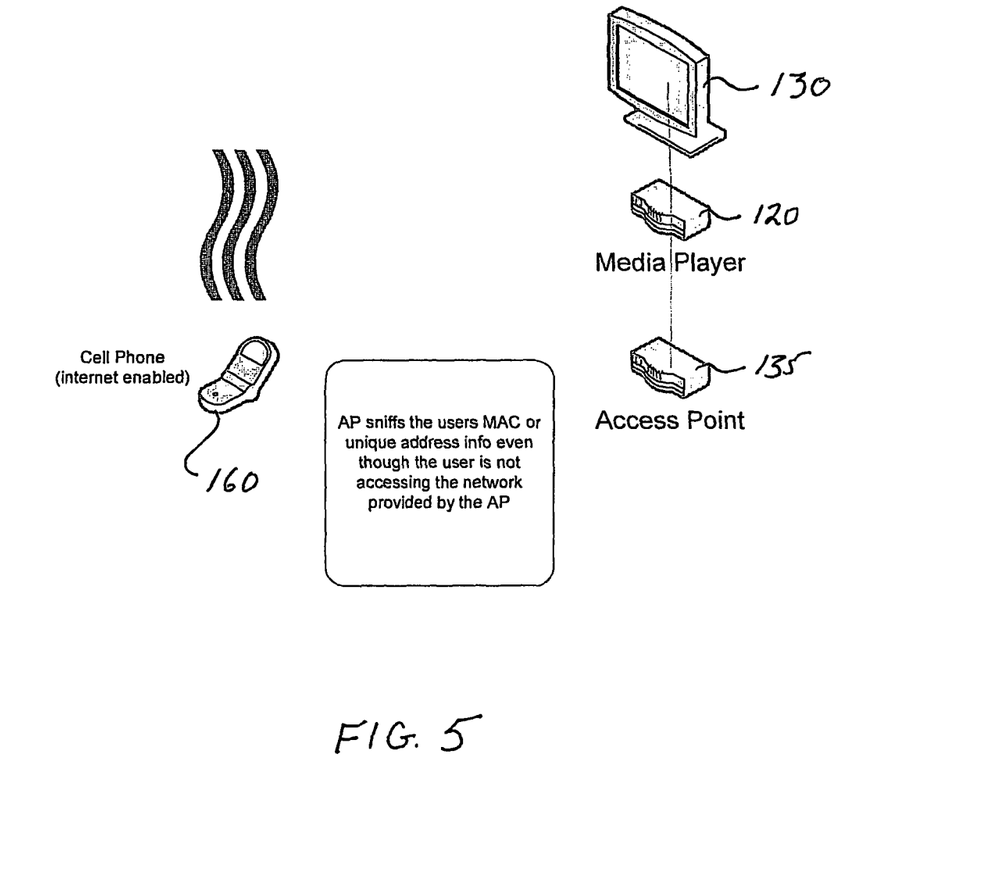
FIG. 5 depicts a block diagram of the system for identifying a user's presence in accordance with another embodiment of the invention.

In the embodiment of FIG. 5, a user that had previously been identified in the content distribution environment 100 can be identified as being present without requiring their active log in to the system. For example, as the user, carrying the mobile device 160, moves around the content distribution environment 100, or visits any node tied to the content distribution system, the mobile device 160 will seek to understand what access points (APs) are available nearby by searching the probe packets sent by the mobile device to "see" what access points (i.e., networks) are available. The probe packets used by the mobile devices 160 use the MAC address of the mobile device, regardless of whether user actually associates and joins the network. Thus, as shown in FIG. 5 (and discussed further in reference to FIG. 6), the system and method of the present invention can identify the user and their corresponding MAC address without requiring their intervention each time they visit the particular content distribution environment 100, through the AP 135 "sniffing" the probe packets of the within range mobile devices, and thereby obtaining the MAC addresses. By passively detecting and processing the probe packets and looking up the MAC addresses in the respective databases, the content distribution environment 100 can determine that a mobile device used to access the network (i.e., at some time in the past) with specific user identification is present. Thus, an inference that the same individual is present in the environment 100 is made, and personalized advertising can be targeted to the display devices nearest the detected user's location within the environment.

Figure 6:
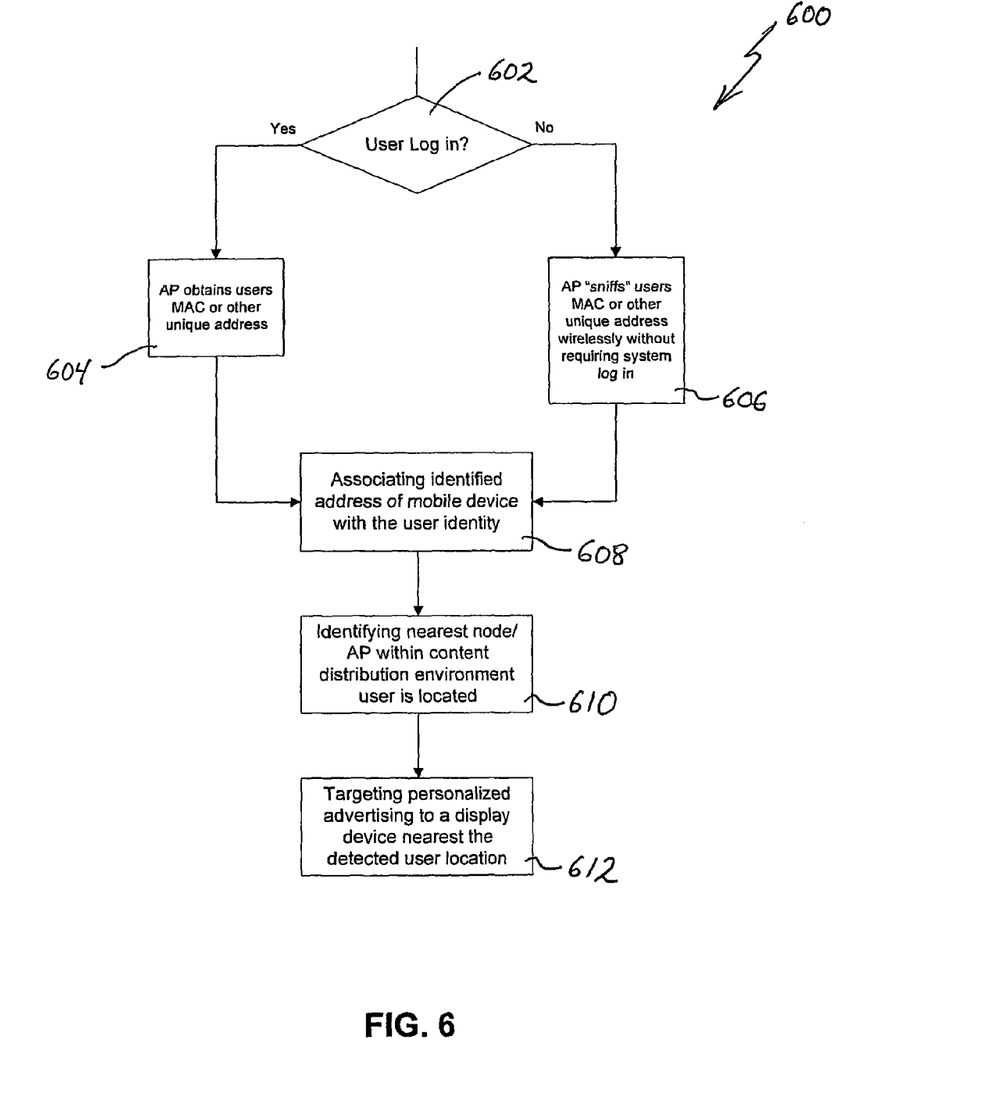
FIG. 6 is a flow diagram of a method for using a mobile device media access control (MAC) address for control and interaction in a content distribution environment in accordance with an embodiment of the present invention.

FIG. 6 depicts a high level flow diagram of a method 600 for targeting media distribution using detected MAC address information from a mobile communication device in accordance with an embodiment of the present invention. Initially, a determination is made as to whether the user has logged into the AP 135 (602). If yes, the AP determines the mobile communication device's MAC address (604) and associates that MAC address with the user's identity (608) by either accessing a local database for the particular content distribution environment, or by accessing off site databases. Once the user's identity has been established, the personalized targeted advertising can be generated/obtained, etc. Using the identified MAC address, the nearest node/AP 135 within the content distribution environment 100 is identified and used to localize the user's physical location within the environment (610). With the user's location localized, the targeted personalized advertising is selectively displayed on display devices closest to the user's identified location (612).

As mentioned previously, in another embodiment, for those user's of mobile device 160 that may have previously registered or signed into a particular distribution environment AP 135 some time prior to the current visit, the APs 135 can obtain that user's MAC address when their mobile device 160 probes to see what networks are available for the device to access (e.g., step 606 in FIG. 6). Thus, once the user's MAC address is obtained in this manner, the system will then associate (608) that MAC address with the user's identity using the prior session log in data (and any other obtainable data relating to this individual) which has been previously stored in a database Having described various embodiments for a method and system for using MAC address information, for control and interaction within a content distribution environment (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A method for communication in a content distribution environment, the content distribution environment being in signal communication with a plurality of other computer networks, comprising:

detecting via a server a media access control (MAC) address of a mobile device present within a predetermined proximity range of the content distribution environment by passively detecting and processing probe packets communicated by the mobile device;

identifying via the server demographic information related to a registered owner of the mobile device, the identifying including searching local databases and computer network databases in processing communication with the content distribution environment, to locate prior session log data using information related to the detected MAC address; and providing a personalized targeted content based on prior session log data to the mobile device when demographic information is located, the personalized targeted content being stored in a location accessible by the content distribution environment;

selecting at least one display device within the content distribution environment on which to display selected content, using the identified demographic information;

the method further comprising playing the content to be displayed on at least one media player in signal communication with the server; and displaying said selected content on at least one display device in signal communication with the at least one media player.

2. The method of claim 1, wherein said detecting further comprises receiving and reviewing probe packets sent by the mobile device, which are intended to determine what networks are available for use by the mobile device.

3. The method of claim 1, wherein said identifying comprises searching a database within the content distribution environment to determine whether the detected MAC address has previously been identified in the content distribution environment.

4. The method of claim 1, wherein said identifying comprises searching a database outside the content distribution environment to correlate the detected MAC address of the mobile phone with a registered owner's demographic information.

5. The method of claim 1, wherein said selecting further comprises identifying a display device in a location able to be seen by a user of the detected mobile device.

6. The method of claim 5, wherein targeted personalized content corresponding to the identified demographic information is displayed on the identified display.

7. A system for communication in a content distribution environment, the content distribution environment being in signal communication with a plurality of other computer networks comprising:

at least one communication device for communicating with mobile devices within the content distribution environment and configured to detect a media access control (MAC) address of a mobile device within a predetermined proximity range of the content distribution environment by passively detecting and processing probe packets communicated by the mobile device; and a server in signal communication with the at least one communication device and being configured to:

identify via the server demographic information related to a registered owner of the mobile device, the identifying including searching local databases and computer network databases in processing communication with the content distribution environment, to locate prior session log data using information related to the detected MAC address;

provide a personalized targeted content based on prior session log data to the mobile device when demographic information is located, the personalized targeted content being stored in a location accessible by the content distribution environment; and select at least one display device within the content distribution environment on which to display selected content, using the identified demographic information;

the system further comprising at least one media player in signal communication with the server and configured to play the content to be displayed; and at least one display device in signal communication with the at least one media player for displaying said selected content.

8. The system of claim 7, wherein said server is configured to determine whether the detected mobile device has logged into the at least one communication device prior and if so, utilizes prior login information to identify demographic information corresponding to a user of the detected mobile device.

* * * * *